(12) United States Patent
Chikkannanavar et al.

(10) Patent No.: US 11,603,011 B2
(45) Date of Patent: Mar. 14, 2023

(54) LITHIUM PLATING DETECTION AND MITIGATION IN ELECTRIC VEHICLE BATTERIES

(71) Applicant: Ford Global Technologies, LLC, Dearborn, MI (US)

(72) Inventors: Satish B. Chikkannanavar, Canton, MI (US); Jonathan Tao, Madison Heights, MI (US); Matthew Allen Tomai, Clawson, MI (US); Christian Edward Shaffer, Canton, MI (US); Kevin Vander Laan, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 558 days.

(21) Appl. No.: 16/692,726

(22) Filed: Nov. 22, 2019

(65) Prior Publication Data

US 2021/0155114 A1    May 27, 2021

(51) Int. Cl.
*B60L 58/14*    (2019.01)
*G06F 17/18*    (2006.01)
*H01M 10/625*  (2014.01)

(52) U.S. Cl.
CPC .............. *B60L 58/14* (2019.02); *G06F 17/18* (2013.01); *H01M 10/625* (2015.04); *B60L 2240/547* (2013.01); *B60L 2240/549* (2013.01)

(58) Field of Classification Search
CPC ... G01R 31/374; G01R 31/389; H01M 10/48; H01M 10/625; B60L 58/14; B60L 2240/547; B60L 2240/549; G06F 17/18
See application file for complete search history.

(56) References Cited

U.S. PATENT DOCUMENTS

| | | | |
|---|---|---|---|
| 8,548,761 B2* | 10/2013 | Lim | B60L 3/0046 |
| | | | 702/63 |
| 9,758,167 B1 | 9/2017 | Pandit et al. | |
| 9,840,161 B2 | 12/2017 | Chikkannanavar et al. | |
| 2016/0116546 A1* | 4/2016 | Sung | H01M 10/48 |
| | | | 324/430 |
| 2017/0133869 A9* | 5/2017 | Reisz | H02J 7/0031 |
| 2017/0203654 A1* | 7/2017 | He | H01M 10/0525 |
| 2019/0113577 A1 | 4/2019 | Severson et al. | |
| 2019/0229378 A1* | 7/2019 | Zhang | G01R 31/382 |
| 2019/0250365 A1 | 8/2019 | Hirota et al. | |
| 2020/0412153 A1* | 12/2020 | Matsumura | H02J 7/007184 |

\* cited by examiner

*Primary Examiner* — Kyle R Quigley
(74) *Attorney, Agent, or Firm* — David B Kelley; Brooks Kushman P.C.

(57) ABSTRACT

A vehicle includes a traction battery and a controller. The controller is programmed to, in response to dynamic resistance and capacity of the traction battery for a drive cycle differing from dynamic resistance and capacity of the traction battery for a previous drive cycle by threshold percentages, controlling the traction battery to reduce lithium plating.

18 Claims, 4 Drawing Sheets

LITHIUM PLATING DETECTION AND MITIGATION IN ELECTRIC VEHICLE BATTERIES

TECHNICAL FIELD

This disclosure relates to detecting and mitigating lithium plating in traction batteries.

BACKGROUND

Electrified vehicles, such as hybrid, plug-in hybrid, and battery electric vehicles use an electric machine powered by a traction battery to drive the vehicle powertrain. Charging and discharging of the battery results in electrochemical processes that affect the charge available to power the vehicle and may vary with ambient and operating conditions such as battery state of charge (SOC), temperature, battery cell balance, and charging/discharging rate or current, for example. In lithium-ion (Li-ion) batteries, metallic lithium may be deposited on the anodes of battery cells under some operating conditions, which may affect battery performance. Batteries are particularly susceptible to this process, referred to as lithium plating, under low operating temperature and high charging currents, although lithium plating may occur under other ambient and operating conditions.

Range anxiety is often an obstacle to adoption of electrified vehicles and refers to customers concerned about not having a sufficient battery charge to reach a particular destination, or having to wait for several hours to recharge the battery. Various charging strategies have been developed to provide faster charging for vehicles that have a depleted battery, or when the driver does not have sufficient time available for conventional charging. However, these charging strategies may result in lithium plating, particularly when charging at low temperatures.

SUMMARY

According to one embodiment, a vehicle includes a traction battery and a controller. The controller is programmed to, in response to dynamic resistance and capacity of the traction battery for a drive cycle differing from dynamic resistance and capacity of the traction battery for a previous drive cycle by threshold percentages, controlling the traction battery to reduce lithium plating.

According to another embodiment, a vehicle includes a traction battery and a controller. The controller is programmed to store voltage data and current data of the traction battery during a drive cycle, and perform a probe cycle of the traction battery, subsequent to the drive cycle, responsive to dynamic resistance and capacity of the traction battery for the drive cycle, derived from the voltage and current data, differing by threshold percentages from dynamic resistance and capacity of the traction battery for a previous drive cycle. The controller is further programmed to, in response to a capacity of the traction battery determined during the probe cycle being less than a calibration capacity of the traction battery by another threshold percentage, controlling the traction battery to reduce lithium plating.

According to yet another embodiment, a vehicle includes a traction battery and a controller. The controller is programmed to store voltage data and current data of the traction battery during a drive cycle, and, in response to the drive cycle ending, calculate a first dynamic resistance of the drive cycle based on the voltage and current data. The controller compares the first dynamic resistance to a second dynamic resistance of the traction battery from a previous drive cycle, and, in response to the first resistance exceeding the second resistance by a first threshold percentage, calculates a first capacity of the traction battery for the drive cycle based on the current data. The controller is further programmed to, in response to the first capacity being less than a second capacity of the traction battery from the previous drive cycle by a second threshold percentage, run a probe cycle of the battery to detect lithium plating of the traction battery. If the probe cycle detects lithium plating, the traction battery is controlled to reduce the lithium plating.

DETAILED DESCRIPTION

As required, detailed embodiments are disclosed herein; however, it is to be understood that the disclosed embodiments are merely representative of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

Figure 1:
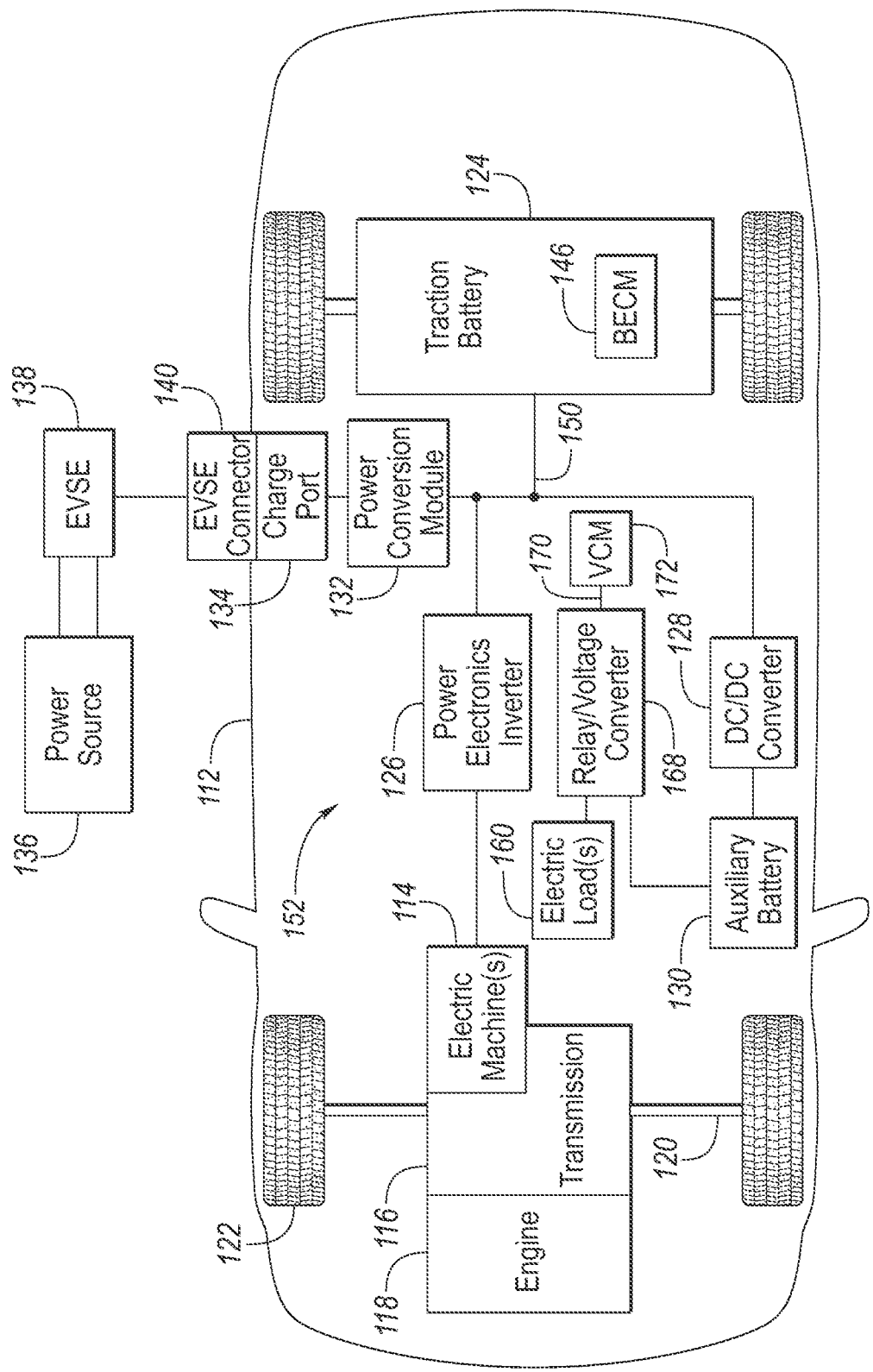
FIG. 1 is a block diagram illustrating an electrified vehicle.

FIG. 1 is a block diagram of a representative electrified vehicle embodiment having at least one controller programmed to detect and mitigate lithium plating. While a plug-in hybrid vehicle having an internal combustion engine is illustrated in this representative embodiment, those of ordinary skill in the art will recognize that the disclosed embodiments may also be utilized in other types of electrified vehicles. The systems and methods disclosed herein are independent of the particular vehicle powertrain with exceptions apparent to those of ordinary skill in the art. For example, controlling an engine to reduce current supplied to the traction battery would not be applicable to a fully electric vehicle. Representative vehicle applications may include hybrid vehicles, electric vehicles, or any other type of vehicle having a battery subject to performance degradation associated with lithium plating.

In the representative implementation illustrated in FIG. 1, a plug-in hybrid-electric vehicle 112 may include one or more electric machines 114 mechanically connected to a transmission 116. The electric machines 114 may be capable of operating as a motor or a generator. For hybrid vehicles, a transmission 116 is mechanically connected to an internal combustion engine 118. The transmission 116 is also mechanically connected to a drive shaft 120 that is mechanically connected to the wheels 122. The description herein is equally applicable to a battery electric vehicle (BEV), where the hybrid transmission 116 may be a gear box connected to an electric machine 114 and the engine 118 may be omitted as previously described. The electric machines 114 can provide propulsion and slow down capability whether or not the engine 118 is operating. The electric machines 114 also act as generators and can provide fuel economy benefits by recovering energy that would normally be lost as heat in the friction braking system during regenerative braking.

For hybrid or electric vehicle applications, a traction battery or traction battery pack 124 stores energy in a plurality of individual battery cells connected together to provide a desired voltage and charge capacity for the electric machines 114. In one embodiment, the battery pack 124 includes an array of lithium-ion battery cells. Lithium plating (also referred to herein as "plating") refers to the process where metallic lithium is deposited on the negative electrodes or anodes of the battery cells and may lead to long-term effects such as capacity loss, increased impedance, decreased efficiency, and in some cases an internal short circuit, for example, depending on the particular structural characteristics of the deposited lithium. Some degree of plating may be reversed during a process referred to as stripping. Irreversible plating may result in permanent changes to the cell anode. Control of battery charging and discharging may be used to strip reversibly plated anodes as well as to reduce or eliminate additional plating. Battery cells are particularly susceptible to plating during charging at low temperatures, high state of charge (SOC), and high charging rates (high current). As such, control of the battery and/or vehicle may include controlling traction battery current to reduce or reverse (strip) lithium plating.

The battery pack 124 typically provides a high-voltage DC output to a high-voltage bus 150, although the voltage and current may vary depending on particular operating conditions and loads. The traction battery pack 124 is electrically connected to one or more external circuits 152, which may include a power electronics or inverter circuit 126, a DC/DC converter circuit 128 and/or a power conversion module or circuit 132, for example. One or more contactors may isolate the traction battery pack 124 from other components when opened, and connect the traction battery pack 124 to the other components when closed. Traction battery pack 124 may include various internal circuits for measuring and monitoring various operating parameters including cell current and cell voltage. Parameters such as voltage, current and resistance for individual battery cells, groups of battery cells, and the entire battery pack (sometimes called pack voltage and pack current) may be monitored and/or controlled by the battery management system (BMS) 146. The traction battery 124 may include associated voltage and current sensor (not shown) the output voltage and current data to BMS 146.

In addition to providing energy for propulsion, the battery pack 124 may provide energy for other external circuits 152 connected to the high-voltage bus 150. The power distribution system of vehicle 112 may also include a DC/DC converter module or circuit 128 that converts the high-voltage DC output of the traction battery 124 to a low-voltage DC supply that is compatible with other vehicle loads that may be directly connected. Other external high-voltage circuits or loads, such as those for cabin or component heaters, may be connected directly to the high-voltage bus 50 without the use of a DC/DC converter module 128.

Vehicle 112 may also include an auxiliary battery 130 having a relatively lower nominal voltage (such as 12V, 24V or 48V, for example) and may be implemented using the same or different battery chemistries than the traction battery pack 124. Auxiliary battery 130 may also be referred to as a low-voltage battery, starter battery or simply the vehicle battery depending upon various applications. Auxiliary battery 130 may be used to power various low-voltage components, controllers, modules, motors, actuators, sensors, etc. generally represented by electric loads 160. One or more relay/voltage converters 168 may be used to power vehicle electrical load(s) 160. In this embodiment, relay/voltage converter 168 includes a relay controlled by a relay input signal 170 provided by a vehicle control module (VCM) 172, which may also be used to directly or indirectly control the vehicle and/or traction battery 124 using the BMS 146. As described in greater detail below, one or more electrical components or accessories may be controlled by VCM 172 and/or BMS 146 to control lithium plating by controlling battery current. In some embodiments, the auxiliary battery 130 may be a lithium-ion battery that is susceptible to lithium plating. While the systems and methods for detecting and mitigating lithium plating are predominately discussed in conjunction with the traction battery, they may also be applied to the auxiliary battery in some embodiments.

The battery pack 124 may be recharged by an external power source 136. The external power source 136 may include an electrical outlet connected to the power grid. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be electrically connected to a charger or on-board power conversion module 132. Alternatively, various components described as being electrically connected may transfer power using a wireless inductive coupling. As described in greater detail below, the power conversion module 132 is another representative electrical device that may be directly or indirectly controlled to limit or reverse lithium plating by controlling battery current. In some applications, battery current may be reduced or stopped during charging, or may be reversed to provide current to the external power source 136 to reduce or reverse lithium plating.

The various components illustrated in FIG. 1 may have one or more associated controllers, control modules, and/or processors such as VCM 172 to control vehicle and traction battery operation. The controllers may communicate via a serial peripheral interface (SPI) bus (e.g., Controller Area Network (CAN)) or via discrete conductors. Various operating parameters or variables may be broadcast or published using the CAN or other conductors for use by vehicle control modules or sub-modules in controlling the vehicle or vehicle components, such as the traction battery pack 124 or electric load(s) 160, for example. One or more controllers may operate in a stand-alone manner without communication with one or more other controllers. The controllers may include the BMS 146 to control various charging and discharging functions, battery cell charge balancing, battery pack voltage measurements, individual battery cell voltage measurements, battery over-charge protection, battery over-discharge protection, battery end-of-life determination, control of lithium plating, battery current polarity or direction (charging and discharging), etc.

The controllers may include and/or communicate with various types of non-transitory computer readable storage media including persistent and temporary storage devices to store control logic, algorithms, programs, operating variables, and the like. In one embodiment, the BMS 146 may communicate with memory for storing values associated with the battery 124 such as dynamic resistance, voltage, current, capacity, thresholds, etc. Similarly, the BMS 146 may communicate with memory having values stored in lookup tables or arrays associated with the traction battery 124 such as calibration capacity, probe cycle operation, temperature, SOC, aging, etc. The BMS 146 may also communicate with a memory storing an accumulated plating history corresponding to battery charging power supplied under lithium plating conditions for use in determination of a battery life estimate.

The life of the traction battery or the auxiliary battery (if applicable) can be increased by detecting reversible lithium plating and taking mitigating action to reverse its effects. Disclosed herein are systems, methods, and controls based on changes in dynamic resistance and changes in battery capacity over cycles. For example, the dynamic resistance of the current cycle can be compared with the dynamic resistance of the previous cycle. If the difference exceeds a threshold, this indicates lithium plating. The capacity of the current cycle can be also compared with the capacity of the previous cycle. If the difference exceeds a threshold, this further indicates lithium plating. The dynamic resistance and the capacity may be used in conjunction to reduce false positives of lithium-plating detection. If the changes in dynamic resistance and capacity indicate lithium plating, diagnostic, including one or more probe cycles, is performed while the vehicle is OFF (during key-off). During each probe cycle, the battery is discharged and capacity is determined. The capacity of the probe cycles is compared to a calibration capacity (i.e., an ideal capacity) and if they differ by more than a threshold, the presence of lithium plating is confirmed. Mitigating action is taken following confirmation of lithium plating. The mitigating action includes, for example, charging and discharging at a reduced rate, warming the battery, etc.

Usage of the battery may be separated into cycles. A cycle may be a period between key-on and key-off, i.e., the cycle starts at key-on and ends at key-off. Other demarcations may be used to define cycles in other embodiments. By comparing measured and calculated values, such as dynamic resistance and capacity, of the cycles to each other, degradations in battery performance can be determined. This disclosure discloses systems and methods for detecting lithium plating by comparing the dynamic resistance and capacity of a current cycle to one or more previous cycles and calibration values.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2A:
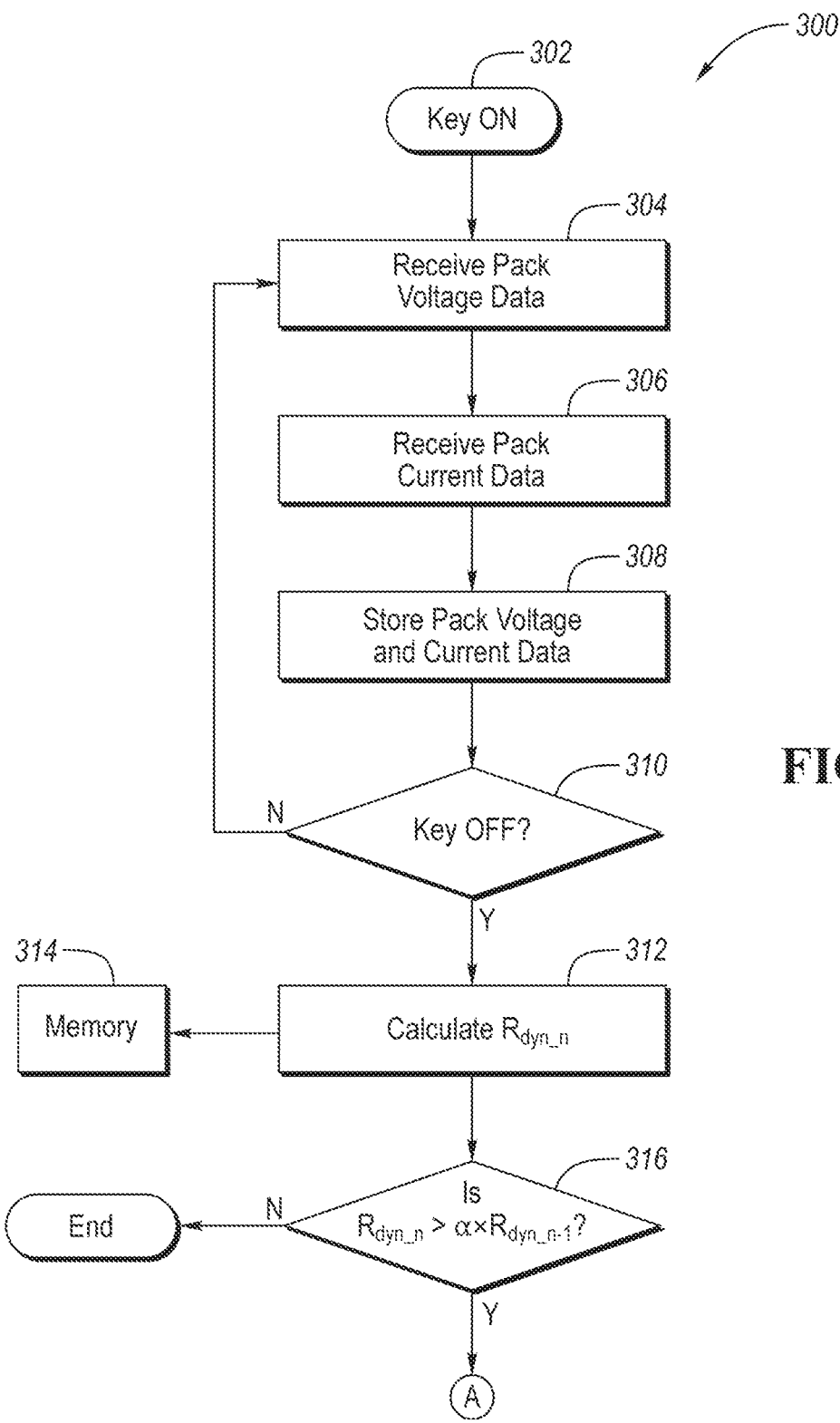
FIGS. 2A and 2B show a flow chart of an algorithm for detecting and mitigating lithium plating.
Figure 2B:
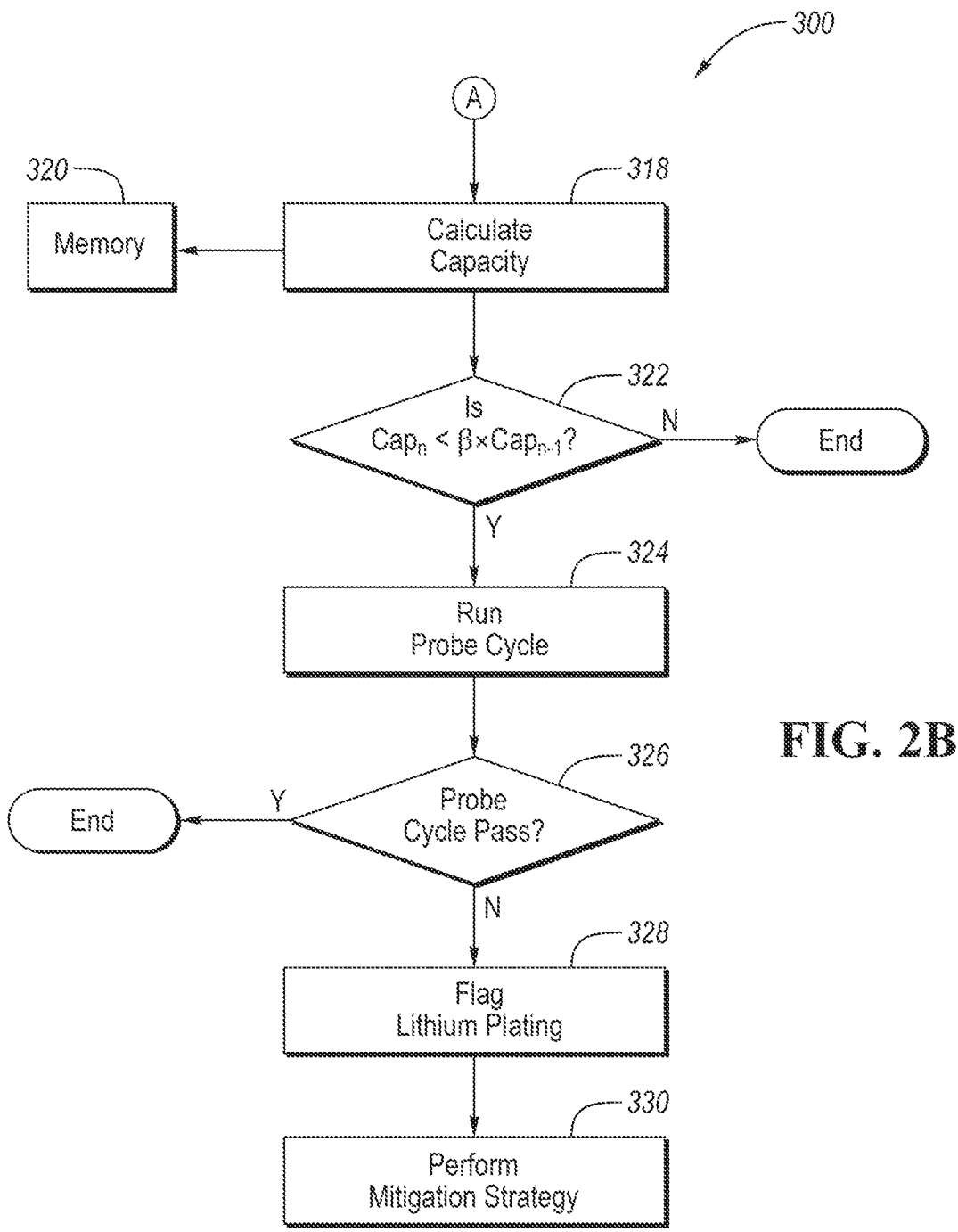

FIGS. 2A and 2B illustrate a flow chart 300 of an algorithm for detecting and mitigating lithium plating. The controls began at operation 302 with a key-on event commencing. (Key-on refers to the car being started). The key-on starts the current drive cycle. During the drive cycle, the controller receives pack voltage data at operation 304 and pack current data at operation 306. This data may be received from voltage and/or current sensors or may be estimated or otherwise calculated based on other measurements. The received voltage and current data are periodically received throughout the drive cycle according to a cycle time of the controls such as every second. At operation 308, the received voltage and current data is stored in memory associated with the controller.

At operation 310, the controller determines if the vehicle is switched to key-off, e.g., the driver has turned off the vehicle. If no, control loops back to operation 304 and the drive cycle continues. If yes, the drive cycle ends and the vehicle performs diagnostics to determine if lithium plating has occurred.

Figure 3:
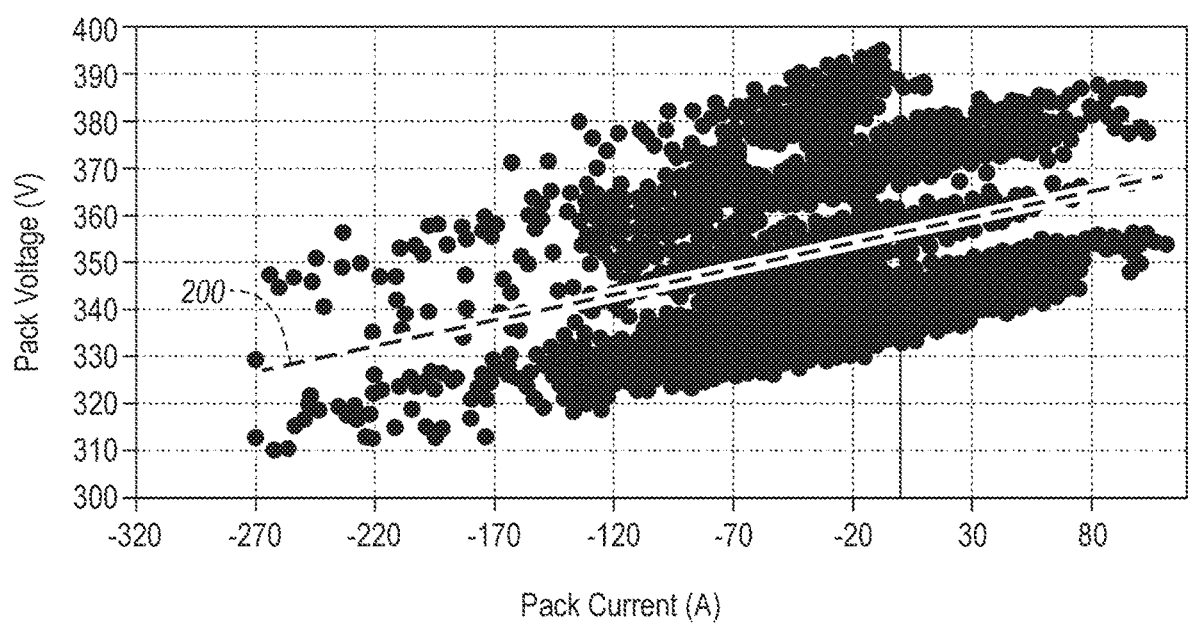
FIG. 3 is a plot of voltage data and current data of a traction battery collected during a drive cycle.

At operation 312, the controller determines the dynamic resistance of the traction battery for the drive cycle. The dynamic resistance is based on the voltage and current data collected during the drive cycle. Linear regression may be used to calculate the dynamic resistance of this data set. FIG. 3 illustrates an example data set of voltage (y-axis) and current (x-axis) determined during a drive cycle. Linear regression may be performed on the data set to determine a trendline 200 of voltage (V) over current (I). The slope of the trendline 200 is the dynamic resistance of the drive cycle. This is just one example of calculating dynamic resistance from voltage and current data and other techniques may be used in other embodiments. The dynamic resistance of the drive cycle may be stored in memory at operation 314 for later use.

At operation 316, the controller compares the dynamic resistance ($R_{dyn\_n}$) of the current cycle (n) with the dynamic resistance ($R_{dyn\_n-1}$) of the previous cycle (n-1), which has been stored in memory associated with the controller. Comparing $R_{dyn\_n}$ and $R_{dyn\_n-1}$ provides an initial screening for lithium plating. If the resistance has increase by a threshold percentage, such as 5 to 50 percent, then lithium plating may be present. Equation 1 may be used to compare the dynamic resistances of the cycles. In equation, the dynamic resistances are absolute values. The threshold ($\alpha$) may be between 1.05 to 1.5, inclusive. Equation 1 is merely one example of calculating a percentage increase in dynamic resistance and others are contemplated.

$$R_{dyn\_n} > \alpha \times R_{dyn\_n-1} \qquad \text{(Eq. 1)}$$

If the dynamic resistance of the current cycle has not increased beyond the threshold, i.e., no at operation 316, the diagnostics for detecting lithium plating ends. If yes at operation 316, the next phase of diagnostics is to compare the capacity of the current cycle to one or more of the previous cycles.

At operation 318, the controller determines the capacity of the traction battery for the current cycle. The capacity may have units of amp hours (Ah) and indicates the amount of charge stored in the battery. The capacity is based on the current data 306. The capacity may be calculated by integrating the current data (I) over the time interval [a, b] as shown in equation 2 for example, where $\alpha$ is the time for the battery at a first SOC at key-on and b is the time for the battery at a second SOC at key-off. The calculated capacity of the cycle is stored in memory at operation 320.

$$\text{Cap} = \int_a^b I\, dt \qquad \text{(Eq. 2)}$$

At operation 322, the capacity of the current cycle ($\text{Cap}_{\_n}$) is compared to the capacity of the previous cycle ($\text{Cap}_{\_n-1}$) to determine if the capacity has depreciated by more than a threshold percentage, e.g., 2 to 10 percent. Equation 3 may be used to compare the capacities of the cycles. In equation 3, the capacities are absolute values. The threshold beta $\beta$ may be between 0.90 to 0.98, inclusive for example.

$$\text{Cap}_{\_n} < \beta \times \text{Cap}_{\_n-1} \qquad \text{(Eq. 3)}$$

If no at operation 322, the diagnostics for detecting lithium plating ends. If yes, indicators of lithium plating are present and the controller may either proceed to further diagnostics, e.g., run a probe cycle, or may flag lithium plating right away. In the illustrated embodiment, a probe cycle is performed at operation 324. The probe cycle may be performed during key off. During the probe cycle, the battery is discharged and a capacity is determined. The probe cycle may be performed in a narrow SOC range or full range of the battery. During the probe cycle, the battery may be discharged at a constant current or at varying currents. If the capacity reduces during the probe cycle more than anticipated, this indicates lithium plating. Through battery testing, calibration capacities (ideal capacities) can be determined for a plurality of discharge events, i.e., from a start SOC to an end SOC. The calibration capacities are stored in the lookup table. A corresponding one of these calibration capacities can then be compared with the capacities determined during the probe cycle to determine if the battery has reduced capacity. If the battery has reduced by more than a threshold percentage, then lithium plating is likely present. For example, the battery may be discharged from an SOC of 70 to an SOC of 40 during a probe cycle. During the discharge, current and voltage data is collected. Based on this data, the controller calculates a capacity of the battery during the probe cycle. The controller then pulls from the lookup table the appropriate calibration capacity (i.e., the calibration capacity associated with a discharge of 70 SOC to 40 SOC) and a comparison is performed at operation 326. Equation 4 may be used, where $\gamma$ may be between 0.95 to 0.98. The probe cycle may also be in the full range of the battery. Here, the capacity change during the probe cycle may be compared to the rated capacity of the traction battery.

$$\text{Cap\_probe} < \gamma \times \text{Cap\_calibration} \qquad \text{(Eq. 4)}$$

If the probe capacity is not less than the calibration capacity by a threshold percentage, the probe cycle has passed and control ends. If, however, the probe capacity is less than the calibration operation capacity by the threshold amount, the probe cycle has not been successful and the controller flags lithium plating at operation 328. The controller may include learning logic that modifies the calibration capacity over time to account for normal battery degradation.

Control proceeds to operation 330 if a flag is present and mitigating action is taken. Reversible lithium plating may be stripped by discharging and charging the battery at lower rates. Heating the battery may also help with the stripping. For example, the controller may be programmed to cycle the traction battery through discharge and charge cycles at lower C rates, such as 0.1 to 0.3 C. The cycling may be performed during key-off with the vehicle connected to wall power. In the case of a hybrid vehicle, the cycling may also be performed during key-on.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery; and
a controller programmed to:
store voltage data and current data of the traction battery during a drive cycle,
in response to the drive cycle ending, calculate a first dynamic resistance of the drive cycle based on the voltage and current data,
compare the first dynamic resistance to a second dynamic resistance of the traction battery from a previous drive cycle,
in response to the first resistance exceeding the second resistance by a first threshold percentage, calculate a first capacity of the traction battery for the drive cycle based on the current data,
in response to the first capacity being less than a second capacity of the traction battery from the previous drive cycle by a second threshold percentage, run a probe cycle of the battery to detect lithium plating of the traction battery, and
in response to the probe cycle detecting the lithium plating, control the traction battery to reduce the lithium plating.

2. The vehicle of claim 1, wherein the probe cycle includes:
discharging the traction battery,
calculating a third capacity of the traction battery during the discharge,
comparing the third capacity to a calibration capacity, and
flagging the lithium plating in response to the third capacity being less than the calibration capacity by a third threshold percentage.

3. The vehicle of claim 2, wherein the discharging is at a constant rate.

4. The vehicle of claim 1, wherein the probe cycle is performed during key-off.

5. The vehicle of claim 1, wherein the first threshold percentage is between 10 and 50 percent, inclusive.

6. The vehicle of claim 5, wherein the second threshold percentage is between 2 and 5 percent, inclusive.

7. The vehicle of claim 1, wherein the first dynamic resistance is calculated using linear regression of the voltage and current data.

8. The vehicle of claim 7, wherein the first capacity is based on an integration of the current data.

9. The vehicle of claim 1, wherein the control the traction battery to reduce the lithium plating includes reducing a charge rate of the traction battery.

10. A method of detecting and mitigating lithium plating in a vehicle traction battery, the method comprising:
storing voltage data and current data of the traction battery during a drive cycle;
in response to the drive cycle ending, calculating a first dynamic resistance of the drive cycle based on the voltage and current data;
comparing the first dynamic resistance to a second dynamic resistance of the traction battery from a previous drive cycle;
in response to the first resistance exceeding the second resistance by a first threshold percentage, calculating a first capacity of the traction battery for the drive cycle based on the current data;
in response to the first capacity being less than a second capacity of the traction battery from the previous drive cycle by a second threshold percentage, running a probe cycle of the traction battery to detect lithium plating of the traction battery; and
in response to the probe cycle detecting the lithium plating, controlling the traction battery to reduce the lithium plating.

11. The method of claim 10 wherein the probe cycle includes:
discharging the traction battery,
calculating a third capacity of the traction battery during the discharge,
comparing the third capacity to a calibration capacity, and
flagging the lithium plating in response to the third capacity being less than the calibration capacity by a third threshold percentage.

12. The method of claim 11, wherein the discharging is at a constant rate.

13. The method of claim 10, wherein the probe cycle is performed during key-off.

14. The method of claim 10, wherein the first threshold percentage is between 10 and 50 percent, inclusive.

15. The method of claim 14, wherein the second threshold percentage is between 2 and 5 percent, inclusive.

16. The method of claim 10, wherein the first dynamic resistance is calculated using linear regression of the voltage and current data.

17. The method of claim 16, wherein the first capacity is based on an integration of the current data.

18. The method of claim 10, wherein the controlling the traction battery to reduce the lithium plating includes reducing a charge rate of the traction battery.

* * * * *